US009025490B2

(12) United States Patent
Davari et al.

(10) Patent No.: US 9,025,490 B2
(45) Date of Patent: *May 5, 2015

(54) NETWORK DEVICE

(76) Inventors: Shahram Davari, Los Altos, CA (US); Saied Tadayon, Potomac, MD (US)

(*) Notice: Subject to any disclaimer, the term of this patent is extended or adjusted under 35 U.S.C. 154(b) by 609 days.

This patent is subject to a terminal disclaimer.

(21) Appl. No.: 13/300,606

(22) Filed: Nov. 20, 2011

(65) Prior Publication Data

US 2012/0301134 A1 Nov. 29, 2012

Related U.S. Application Data

(63) Continuation-in-part of application No. 13/007,816, filed on Jan. 17, 2011.

(51) Int. Cl.
*H04L 12/24* (2006.01)
*H04L 12/40* (2006.01)
*H04L 12/10* (2006.01)
*H04L 12/26* (2006.01)

(52) U.S. Cl.
CPC .............. *H04L 41/5038* (2013.01); *H04L 43/00* (2013.01); *H04L 12/2602* (2013.01); *H04L 41/5003* (2013.01); *H04L 43/10* (2013.01); *H04L 43/0811* (2013.01); *H04L 41/24* (2013.01); *H04L 12/10* (2013.01); *H04L 12/40032* (2013.01); *H04L 43/0817* (2013.01); *H04L 43/062* (2013.01); *H04L 43/0841* (2013.01); *H04L 43/0858* (2013.01); *H04L 43/0835* (2013.01); *H04L 43/0864* (2013.01); *H04L 41/0213* (2013.01)

(58) Field of Classification Search
None
See application file for complete search history.

(56) References Cited

U.S. PATENT DOCUMENTS

| | | | | |
|---|---|---|---|---|
| 5,432,907 A * | 7/1995 | Picazo et al. | ................... | 709/249 |
| 6,441,931 B1 * | 8/2002 | Moskovich et al. | ............... | 398/9 |
| 6,516,025 B1 * | 2/2003 | Warke et al. | ................... | 375/222 |
| 6,970,428 B1 * | 11/2005 | Kobayashi | ..................... | 370/241 |
| 7,099,580 B1 * | 8/2006 | Bulbul | ............... | 398/9 |
| 8,382,384 B2 * | 2/2013 | Nekado et al. | ................... | 385/92 |
| 8,416,763 B1 * | 4/2013 | Montini et al. | ............... | 370/350 |
| 8,594,497 B2 * | 11/2013 | Underwood et al. | ........... | 398/25 |
| 8,873,946 B2 * | 10/2014 | Mayo et al. | ..................... | 398/10 |
| 2003/0021250 A1 * | 1/2003 | Willins et al. | ................ | 370/338 |
| 2004/0120660 A1 * | 6/2004 | Go et al. | ......................... | 385/92 |
| 2005/0099949 A1 * | 5/2005 | Mohan et al. | ............. | 370/236.2 |
| 2005/0129035 A1 * | 6/2005 | Saito | ............................. | 370/401 |
| 2005/0254431 A1 * | 11/2005 | Sills | ............................ | 370/241 |
| 2006/0130152 A1 * | 6/2006 | Katoh et al. | .................... | 726/29 |
| 2006/0182036 A1 * | 8/2006 | Sasagawa et al. | ............ | 370/242 |
| 2008/0194250 A1 * | 8/2008 | Byun | ............................ | 455/425 |
| 2008/0216143 A1 * | 9/2008 | Ikeda et al. | .................... | 725/116 |
| 2009/0103916 A1 * | 4/2009 | Dolan, III | ......................... | 398/9 |
| 2009/0109987 A1 * | 4/2009 | Kampmann et al. | ......... | 370/401 |
| 2009/0164625 A1 * | 6/2009 | Roll et al. | ..................... | 709/224 |
| 2009/0317073 A1 * | 12/2009 | Hotchkiss et al. | ............... | 398/1 |

(Continued)

*Primary Examiner* — Alpus H Hsu
*Assistant Examiner* — Hooman Houshmand
(74) *Attorney, Agent, or Firm* — Bijan Tadayon; Saied Tadayon

(57) ABSTRACT

In this application, we have the following examples: (1) Integrating the NID functionality in to the small foot-print of an SFP Module, with one or more of the features below: a) Mounting a NID SoC IC to an existing SFP Printed Circuit Board (PCB); b) Using the power from the SFP module, without requiring separate external power; c) NID SoC having only 2 ports, each with its own MAC and possibly PHY layer; d) NID SoC having an embedded microprocessor, RAM and ROM. Many examples and applications are provided.

22 Claims, 13 Drawing Sheets

(56) References Cited

U.S. PATENT DOCUMENTS

| | | | |
|---|---|---|---|
| 2010/0150556 A1* | 6/2010 | Soto et al. | 398/66 |
| 2010/0178054 A1* | 7/2010 | Cain | 398/58 |
| 2010/0246582 A1* | 9/2010 | Salinger et al. | 370/392 |
| 2010/0280858 A1* | 11/2010 | Bugenhagen | 705/7 |
| 2010/0303465 A1* | 12/2010 | Dahlfort | 398/115 |
| 2011/0141457 A1* | 6/2011 | Levin et al. | 356/73.1 |
| 2011/0243568 A1* | 10/2011 | Lai | 398/138 |
| 2012/0201141 A1* | 8/2012 | Inoue et al. | 370/238 |
| 2012/0230202 A1* | 9/2012 | Reed | 370/241 |

* cited by examiner

NETWORK DEVICE

RELATED APPLICATION

This invention is a CIP (Continuation-in-Part) of another copending application Ser. No. 13/007,816, with the same title and assignee, and a common co-inventor, filed Jan. 17, 2011, and all of the teachings and specification of the parent case, Ser. No. 13/007,816, are incorporated herein, by reference. Please note that this CIP application only adds various examples and applications to the original idea, in the parent case.

BACKGROUND OF THE INVENTION

This invention relates to network connectivity, devices, system, and management. Here are the rough definitions/terminology for acronyms that we are using in this disclosure. The definitions are given solely for the purpose of illustrations and examples, for a better clarification for the reader. Therefore, the definitions are not meant to limit the scope of the invention by any means. In addition, the definitions are not meant to limit or change the actual scope/meaning of the acronyms by any means.

ROUGH DEFINITIONS/TERMINOLOGY

NID: Network Identification Device, or sometimes called Network Interface Device or Network Demarcation Device (NDD). NID is installed at customer premise so that a communication service provider can diagnose and ensure service delivery up to the NID.

SFP: Short Form factor Pluggable optical module. SFP is plugged into communication requirements, such as switch and routers, to provide a media conversion, such as converting electrical signals to optical for transport over fiber optics. SFP is mainly used for data rates of 1 Gbit/s to 5 Gbit/s.

XFP: is the same as SFP, but for higher data rates, such as 10 Gbit/s.

OAM: Operation, Administration and Management. OAM is a powerful tool used by communication service providers to manage and diagnose communication problems.

SP: Service Provider is a company that provides data, voice (and possibly video communication), and connectivity for the customers. Example of SP is AT&T and Verizon.

MEF: Metro Ethernet Forum: is an industry forum that is chartered to define Ethernet services and interoperable capabilities.

MAC: Media Access Control: is a Data link layer protocol used by Ethernet.

SNMP: Simple Network Management Protocol is a standard protocol that manages the equipment in a data communication network.

NMS: Network Management System is the software that controls the complete network of a service provider.

802.1 and 802.3: are IEEE (Institute of Electrical and Electronics Engineers) standard groups that standardize the Ethernet.

MPLS: Multi-Protocol Label Switching is a standard protocol that is used in routed networks.

SLA: Service Level Agreement is a set of parameters that are agreed between a service provider and customer, and must be guaranteed by service provider, and monitored for compliance.

WAN: Wide Area Network refers to the network that covers a large geographical area.

NE: Network Element is any router or switch that forwards and processes the messages.

CPE: Customer Premise Equipment is an electronics equipment that is placed at the customer site, but belongs to the service provider.

MEP and MIP: Maintenance End Point and Maintenance Intermediate Point are reference points that can initiate or process the OAM messages.

CIR: Committed Information Rate is the data rate that is guaranteed by the service provider to be delivered to the customer.

EIR: Excess Information Rate is the data rate that is NOT guaranteed by the service provider to be delivered to the customer, but the service provider does its best effort to deliver them.

CBS: Committed Burst Size: The Max amount of short term traffic associated with CIR that the service provider guaranteed to support.

EBS: Excess Burst Size: The Max amount of short term traffic associated with EIR that the service provider does its best to support.

OPEX: Operational Expenditure.

CAPEX: Capital Expenditure.

ITU-T: International Telecommunication Union: is a body of the United Nations that regulates telecommunication worldwide.

IETF: Internet Engineering Task Force: is a standard organization that standardizes the Internet technology.

MIBs: Management Information Base: defines series of parameters and variables that are needed to control any communication protocol or technology.

BW: Bandwidth: refers to the Max data-rate supported.

C-VLAN: Customer Virtual Local Area Network: is a virtual network identified by a Tag in the Ethernet frame/message.

P-Bits: Priority bits: are 3 bits of information encoded in a VLAN tag that identify the priority of an Ethernet frame.

XAUI: Extended Attachment Unit Interface: is a 10 Gbit/s serial link standard used in an Ethernet equipment.

XENPAK: is an optical module that does the same function as that of an XFP, but is larger in size.

ACL: Access Control List: is basically filtering frames, to prevent unauthorized access to the network by a customer.

POE: Power over Ethernet is a technology that can deliver Electrical power using the Ethernet wiring.

CAT5: is a type of wiring used for connecting various Ethernet pieces of equipment to each other.

EMS-NMS: Element Management System—Network Management System.

SoC: System on a chip: is a semiconductor chip with Input/Outputs and an embedded microcontroller. It may also have hardware acceleration functions, such as TCP/IP offload, CRC calculation, IPSEC, MACSEC, and the like.

PCB: Printed Circuit Board.

CRC: Cyclic Redundancy Check is a error detection code used in data frames to detect bit errors.

ICV: Integrity Check Value is a error detecting code, such as CRC, that ensures packet is not modified.

PHY: A semiconductor device that terminates and processes the Physical Layer signals.

Serdes: Serializer/Deserializer: is an electronic function that converts parallel signals to serial and vice versa.

PE: Provide Edge device: is a switch/router that is located at the edge of a SP network and connects (directly or indirectly) to customer equipment (CE).

CE: Customer Equipment is a switch/router that is located at the customer premise and connects (directly or indirectly) to Provide Edge device, PE.

CLE/NTE: Customer Located Equipment/Network Termination Equipment.

SFI: Serdes Framer Interface is a scalable interface, defined by OIF (Optical Interworking Forum), between PHY and Framer chips.

SFP+: The enhanced small form-factor pluggable is an enhanced version of the small form-factor pluggable transceiver, commonly known as SFP. It supports data rates up to 10 Gbit/s.

CFP: CFP Multi-Source Agreement (MSA) defines a hot-pluggable optical transceiver form factor, to enable 40 Gb/s and 100 Gb/s applications, including next-generation High Speed Ethernet (40 GbE and 100 GbE). Pluggable CFP transceivers will support the ultra-high bandwidth requirements of data communications and telecommunication networks that form the backbone of the Internet.

SFF: Same as SFP but not pluggable.

GBIC: Giga Bit Interface Converter is a hardware module used to attach network devices to fiber-based transmission systems, such as Fibre Channel and Gigabit Ethernet. The GBIC converts the serial electrical signals to serial optical signals and vice versa, similar to SFP, but with different size and physical format.

PON SFP: An SFP for PON application with built-in PON OLT or ONU/ONT functionality.

XPAK: Next generation XENPAK for 10 Gbit/s interfaces with 10 Gbit/s XAUI electrical interface.

X2: The X2 MSA specifies a module that is physically shorter than XENPAK, mounts on the topside of the host PCB, and uses the established electrical I/O specification.

300-PIN MSA: A 10 G to 40 G module for Electrical to Optical conversion.

XSBI: Stands for the 10 Gigabit Ethernet 16-bit Interface, as defined by the IEEE 802.3ae Working Group. It is intended to be an electrical interface between 300-pin MSA optical transponders and the ICs sitting on the system side.

ACL: Access Control List prevents specific packets meeting or not meeting some preconfigured criteria, to pass through or not.

SGMII: Serial Gigabit Media Independent Interface. It is a standard IEEE 802.3 interface that connects a PHY to a MAC.

QSGMII: Quad SGMII, is a serial interface that can carry 4× Gigabit of traffic.

IPSEC: IP Security is an IETF standard method of encrypting IP packets.

OSPF: Open Shortest Path First is an IETF standard control plane for IP networks.

SPT: Spanning Tree protocol is an IEEE standard control plane for Ethernet networks.

LDP: Label distribution Protocol is an IETF standard control plane for MPLS networks.

IGMP: Is an IETF standard control plane for IP Multicast.

PON: Plain Optical Network, which is an Access technology that uses optical splitters instead of switches, to distribute traffic to many customers.

EPON: Ethernet PON is a PON technology, standardized by ITU.

GPON: Generic PON is a PON technology standardized by ITU-T.

ONU: Optical Networking Unit is the PON terminal installed at customer site to terminate PON.

TPMR: Two Port MAC Relay, based on IEEE 802.1aj standard.

SyncE: Synchronous Ethernet based on ITU-T G.8261, G.8262 and G.8264 standards.

MACSEC: MAC Security is an Ethernet Security mechanism that encrypts the data on an Ethernet Link.

DDM: Digital Diagnostics Monitoring are functions that are used for diagnosing problems in an SFP, such as Low Vcc voltage, High Vcc voltage, Low Laser Bias, High Laser Bias, Low temperature, Hi temperature, etc.

SNMP: Simple Network Management Protocol.

RMI: remote Management Interface (SNMP over IP)

NETCONF: IETF protocol for Network Management

INTRODUCTION

A NID is generally used as a Demarcation Device to mark the hand-off point between a service provider (SP) and a customer, or between two service providers. The main function of a NID is to permit the SP to monitor the health of the connection and the service up to the NID (hand-off point), therefore, eliminating finger-pointing. A NID could also perform more advanced functions, such as rate adaptation, media conversion, policing, shaping, security, performance monitoring, statistics collection and even packet header manipulation. A NID generally could have 2 or more physical ports.

MEF is working on the definition of NIDs. IEEE 802.1aj is also the specification of Two Port MAC relay, which is mainly used in NIDs.

An SFP-NID is a NID that has only 2 physical ports and fits inside an SFP, XFP, or Xenpack module. It can also fit inside a dingle that could attach to Ethernet ports that support PoE (Power-over-Ethernet). An SFP-NID is powered by the host equipment that it attaches to, and does not require separate power supply. The differentiating factors of SFP-NID, compared to NIDs in the market, are that it is much smaller and does not require external power. Therefore, it is cheaper and easier to store and does not require extra space for installation. It could also be easily and cheaply mailed to customers for self-installation.

SUMMARY OF THE INVENTION

The main function of SFP-NID is to provide OAM capability for SPs, to check the status and health of the connections and services up to the SFP-NID. Other functions are rate adaptation, media conversion, and in-band management and configuration via SNMP modules and NMS interface. A more advanced SFP-NID could also provide added functions, such as security, policing, shaping, performance monitoring, and statistics collection and header manipulation (such as MPLS, 802.1ad, and 802.1ah encapsulation).

Any optical module, including the following optical modules, may include the SFP-NID functionality:

SFP
SFP+
CFP
SFF
GBIC
PON MSA
XFP
XPAK
X2
XENPAK
300-PIN MSA

In this invention, we have the following embodiments, as some examples:

1. Integrating the NID functionality in to the small footprint of an SFP Module, with one or more of the features below:
   a. Mounting a NID SoC IC to an existing SFP Printed Circuit Board (PCB)
   b. Using the power from the SFP module, without requiring separate external power
   c. NID SoC having only 2 ports, each with its own MAC and possibly PHY layer
   d. NID SoC having an embedded microprocessor, RAM and ROM
   e. Running a Web portal or other remote login and management software on the NID SoC
   f. Miniaturizing the NID to make it cheaper, with reduced cost of inventory, shipment, and installation
   g. Supporting one or more (multiple) of the following functions in NID SoC:
      OAM
      Media conversion
      Rate adaptation
      Policing & marking
      Shaping
      SLA performance monitoring
      Statistics collection
      Header manipulation
      Security
      In-band management
      Out-of-band management
      In-band control plane
      Out-of-band control plane
      Time stamping
      Packet or byte counter stamping
2. Building the NID functionality in a Dongle that hangs off an Electrical Ethernet port that supports POE (Power over Ethernet), with one or more of the features below:
   a. Similar to SFP-NID, but hanging off an Electrical Ethernet port
   b. Using the power from the Ethernet port POE, without requiring separate external power.
3. SFP-NID including packet processor that can operate on packets at line rate.
4. SFP-NID including packet generator that can generate any configured packet or stream of packets at any configured rate, up to the SFP line rate.
5. SFP-NID can Support any of the following functionalities:
   Simple Link-level loopback
   Leaky Link-Level loopback
   Protocol Layer loopback
   Flexible Packet generation
   Flexible/programmable packet processing and termination
   In-service and out-of-service testing
   Clock and Time Synchronization
   Time stamping of packets
   Counter stamping of packets
   Protection Switching
   Access Control List
   Protocol conversion and Interworking
   Tunnel initiation and termination
   Header manipulation
   Sequence number processing
6. SFP-NID can support any Electrical system-side Interface, including, for example:
   Serdes
   XAUI
   SFI
   XSBI
   SGMII
   QSGMII
   XGMII
7. SFP-NID can support any Optical or Electrical network Interface, including, for example:
   a. 100BASE-FX
   b. 1000BASE-FX
   c. 1000BASE-LX
   d. 1000BASE-SX
   e. 100BASE-T
   f. 1000BASE-T
   g. 10GBASE-T
   h. 10BASE-Fiber
   i. SONET/SDH
   j. T1/E1
   k. T3/E3
   l. Any future high-speed interface rate, such as 40 G and 100 G.
8. SFP-NID could be implemented in any optical module, including, for example:
   SFP
   SFP+
   CFP
   SFF
   GBIC
   PON MSA
   XFP
   XPAK
   X2
   XENPAK
   300-PIN MSA
9. Clock source can be recovered from System or Network side interfaces, or can be locally generated via an oscillator, such as a crystal oscillator.
10. Time stamping of all or a subset of packets
11. Counter stamping of packets
12. In-band or out-of-band management processing
13. In-band or out-of-band control plane processing
14. SFP-NID metal body acting as heat sink, to dissipate heat
15. SFP-NID supports PON (EPON or GPON) termination and conversion to Ethernet in ONU and OLT.

An SFP-NID may also support any of the following functions:
   Simple Link-level loopback
   Leaky Link-Level loopback
   Protocol Layer loopback
   Flexible Packet generation
   Flexible/programmable packet processing and termination
   In-service and out-of-service testing
   Clock and Time Synchronization
   Protection Switching
   Access Control List (ACL)
   Two Port MAC Relay
   In-band or out-of-band configuration and management
   Warm and Cold booting and Reset

BRIEF DESCRIPTION OF THE DRAWINGS

The following figures are just some examples/embodiments, to explain better.

DETAILED DESCRIPTION OF THE PREFERRED EMBODIMENTS

Figure 1:
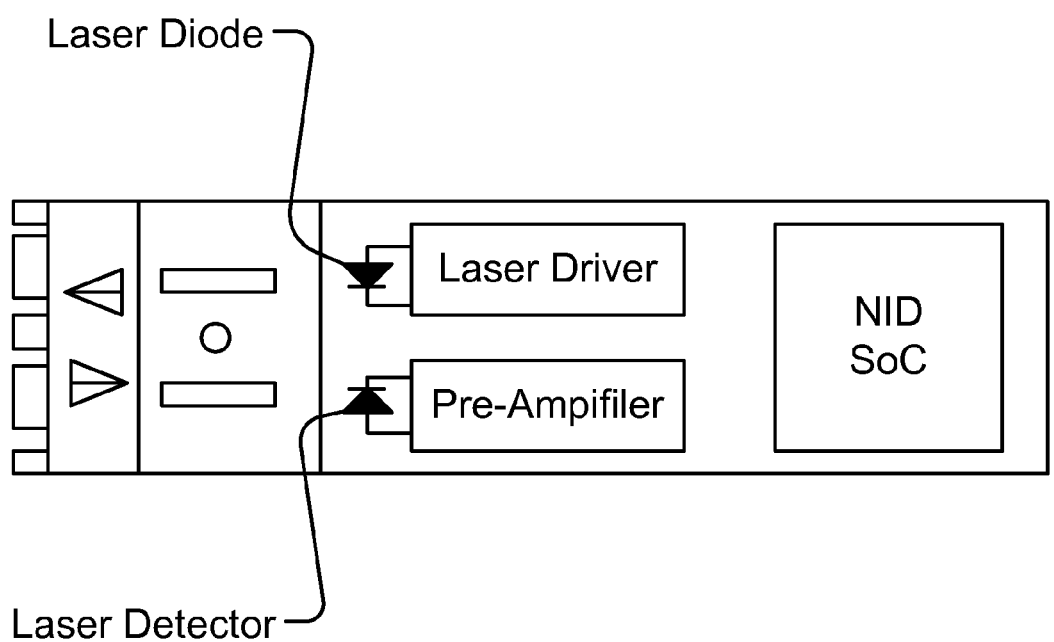
FIG. 1 shows an example (top view) of the Physical layout of an SFP-NID, built on a standard SFP module.

Here are some of the embodiments/examples of the current invention:

SFP-NID Functional Definition

SFP-NID is a demarcation device that is mainly used at hand-off point between a customer and a SP, to demark the responsibility of an SP and a customer. It could also be used as a demarcation device between two SPs. For example, it can be used at each end of an E-NNI (or External Network-to-Network Interface). An SFP-NID is mainly used to monitor the health of connection and service and to diagnose failures up to the SFP-NID.

An SFP-NID has 2 physical ports, one that connects to the SP WAN link, and another one that connects to the customer NE (CPE) or another SP network element. It also has a logical port that is connected to the management interface.

An SFP-NID may support any of the following functionalities:
  OAM
  Media conversion
  Rate adaptation
  Policing & marking
  Shaping
  SLA performance monitoring
  Statistics collection
  Header manipulation
  Security
  In-band management
  OAM An SFP-NID should support OAM functionalities that are required to detect and diagnose connectivity failure. An SFP-NID may support the following OAM suites:
  Ethernet Link OAM based on IEEE 802.3ah.
  Ethernet Service OAM based on IEEE 802.1ag.
  Ethernet OAM based on ITU-T Y.1731 standards.
  IP and MPLS OAM (BFD) based on IETF RFC-5880, RFC-5881, RFC-5882, RFC-5883, RFC-5884, RFC-5885 and future MPLS OAM standards.

Ethernet OAM and IP/MPLS OAM may support the following functions:
  Connectivity Check:
    Periodic Connectivity Check messages are sent and received at configured rate to ensure a loss of connectivity is detected quickly
  Connectivity Verification:
    Connectivity Verification is similar to Connectivity Check, with the added functionality of checking the source ID of the transmitter to ensure the Connectivity Verification messages are coming from the correct source. The result may be communicated to the in-band or out-of-band management.
  Loopback:
    Loopback OAM messages are received and Loopback OAM reply messages are generated and sent back to the source node. In this operation, the Source Address (SA) and Destination Address (DA) are swapped. SFP-NID may also initiate Loopback Message and received Loopback Reply and report the result to management.
  Latching Loopback:
    Loops back all packets or a subset of the packets exiting a specific port. This type of loopback requires the Source Address (SA) and Destination Address (DA) to be swapped.
  Mirroring:
    A duplicate of all or a subset of the packets entering a port or exiting a port are created and sent to a predetermined destination.
  Link Trace:
    After receiving a Link Trace Message, a Link Trace Reply is generated. SFP-NID may also initiate a Loopback Message and received Loopback Reply. The result of the Link Trace may be reported back to in-band or out-of-band management.
  Alarm Indication Signal (AIS):
    AIS is an OAM packet that may be generated and sent to the client layer or to the in-band or out-of-band management, in case of a failure in a layer network, detected via Connectivity Check, Connectivity verification, or other methods.
  Remote Defect Indication (RDI):
    RDI is an OAM packet that may be generated and sent back via the reverse direction of the optical link, to indicate a failure in the forward direction, such as a failure in a layer network, detected via Connectivity Check, Connectivity verification, or other methods.
  Lock function:
    Lock is a OAM message that when received indicates that the other end of the link is in administrative Lock state (Down state) and cannot accept any traffic. SFP-NID should be able to be put in Lock state, administratively, and to generate Lock messages. It should also be able to receive Lock messages from the remote node, and stop sending traffic.
  Test function:
    Test is also an OAM message that can be sent, at up to the line rate to test throughput, as well as error and drop rate. SFP-NID should be able to support generating Test OAM messages, as well as receiving and processing Test OAM messages.
  Dying Gasp:
    When the power of the SFP-NID is being cut, such as when SFP-NID is being unplugged, or when the line card, that SFP-NID is attached to, is being removed from the router/switch, or when the power of the switch/router is cut, the SFP-NID should generate a last message, called Dying Gasp, to inform the other end that power outage is imminent.
  Port and Interface failure indication:
    Upon any port or interface failure detection, such as no detection of laser on optical interface, or no detection of any signal or clock on electrical interface, SFP-NID should be able to generate a Port and Interface failure indication that may be sent to the remote end, via OAM methods, or may be communicated to the in-band or out-of-band management.

In order to support Link OAM, the SFP-NID should support Passive DTE functionalities, as per IEEE 802.3ah. And, to support Service OAM, the SFP-NID should support Service Provider and Network operator level MEPs, as well as Customer level MIPs.

Media Conversion

An SFP-NID generally should support media conversion. The network-side interface (most commonly) is 1000BASE-LX, while the customer-side interface (most commonly) is 100BASE-FX or 1000BASE-SX or 1000BASE-LX. An SFP-NID could support any Ethernet PHY at customer and network interfaces.

In one example, the SFP-NID may be used to convert PON (GPON or EPON) to Ethernet. In this application, the SFP-NID processes and terminates the PON protocol and extracts Ethernet payload. This is a valuable application, since it eliminates a piece of the Equipment (PON ONU) and replaces it with an SFP-NID optical module. Such SFP-NID may then be inserted into the customer router or wireless router.

Figure 12:
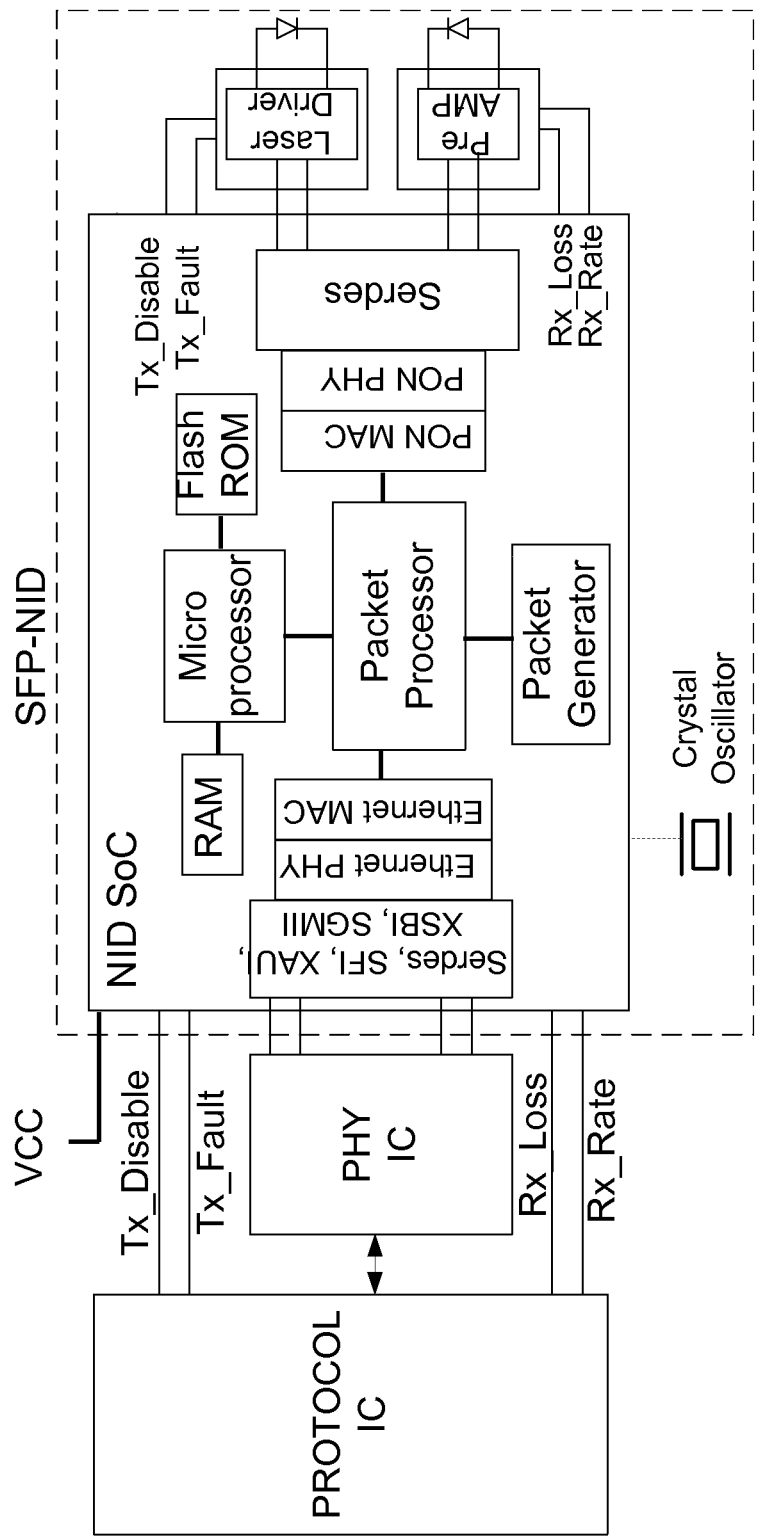
FIG. 12 shows an example for SFP-NID supporting PON termination.

Note that to support PON termination, the SFP-NID must support PON MAC on the network side and Ethernet MAC on the customer side. Example is shown in FIG. 12.

In another example, the SFP-NID may be used to convert OTU (Optical Transport Unit) to Ethernet or IP/MPLS. In this application, the SFP-NID processes and terminates OUT protocol layers and extracts Ethernet or IP/MPLS payload. This is valuable, since it can instantly add an OTN interface to a router or switch.

Rate Adaptation

When the customer-side interface and the network-side interface have different rates, the SFP-NID should support enough buffering for rate adaptation between the two interfaces. For example, rate adaptation is required when the customer-side interface is 100BASE-FX and the network side interface is 1000BASE-LX.

Policing and Marking

An SFP-NID could optionally support Policing and Marking of packets (i.e., Bandwidth Profiling), based on single or dual token bucket algorithms, specified in MEF10. Dual bucket policer could enforce the Committed and Excess rates and bursts: (CIR, CBS), (EIR, EBS). The SFP-NID could also mark the P-bits the packets based on policing results, as per 802.1D/Q/ad/ah.

However, since and SFP-NID has only 2 ports and does not support customer multiplexing, it is more efficient from OPEX and CAPEX point of view, for the upstream node to perform policing and marking of packets, rather than the SFP-NID, and therefore, keeping the SFP-NID simpler and cheaper.

Shaping

An SFP-NID may optionally support shaping of traffic toward the customer, based on Egress BW profile. It may also support ingress shaping of customer traffic, when the customer traffic is bursty, and the customer cannot shape the traffic to the agreed SLA.

However, since and SFP-NID has only 2 ports and does not support customer multiplexing, it is more efficient from OPEX and CAPEX point of view, for the upstream node to perform shaping, rather than the SFP-NID, and therefore, keeping the SFP-NID simpler and cheaper.

SLA Performance Monitoring

An SFP-NID may support SLA performance monitoring, by supporting Ethernet Performance OAM, as per ITU-T Y.1731. This means that the SFP-NID could support one-way and two-way packet loss measurement, as well as one-way and two-way delay and one-way and two-way jitter measurement.

Statistics Collection

An SFP-NID should support standard Ethernet MIBs counters, as per IETF and MEF standards, such as number of packets sent or received, number of errored packets, and the like. These counters could be used for diagnostics and/or billing purposes. An SFP-NID may support packet or byte counters to count any types of packets, such as a specific flow (for example a specific VLAN), dropped packets, error packets, and the like.

Header Manipulation, Protocol Conversion, and Tunneling

An SFP-NID could support header manipulation, such as VLAN translation, or addition of a new header, such as 802.1ad, 802.1ah, or MPLS. This may include protocol conversion and tunneling packets, such as creating and terminating L2TP, GRE, MPLS, IP-in-IP, and other types of tunnels.

Security

An SFP-NID could support security measures, such as ACL and Link security, based on 802.1ae and 802.1af. The security measures are invisible to the customer and are all measures inside the service provider network. Therefore, such security measures do not enforce any requirements on customer equipment. SFP-NID may also support Authentication and encryption/decryption functions, such as IEEE 802.1X, IPSEC (IP Security), MACSEC (MAC Security), and the like. These Authentication and or Encryption functions may be based on Public/Private keys or other well-known Security methods. One of the main reasons for Security measures is to prevent customers from gaining access to the Service Provider's management system.

In-Band or Out-of-Band Management

An SFP-NID should support in-band or out-of-band management, in order to configure the SFP-NID and read counters and states, via EMS-NMS. Example of In-band management is to use a specific MAC-Address, Ethertype or IP Address, or TCP/UDP port number for management channel. Example of out of band management is to use a specific VLAN or MPLS Label. Various in-band and out-of-band management protocols may be used, such as SNMP or RMI (Remote Management Interface) that uses SNMP over IP, NETCONF, and the like. Another method for out-of-band management is to use the 2-Wire (I2C) interface on the SFP-NID. The SFP-NID could also support a simple Web portal, to make it user friendly, for remote reading and configuration.

Simple Link-Level Loopback

An SFP-NID may support looping back all packets entering the device without modifying the packets. This function may be based on IEEE 802.3ah standard.

Leaky Link-Level Loopback

An SFP-NID may support looping back all packets entering the device, except the OAM and management frames, without modifying the packets. This function may be based on IEEE 802.3ah standard.

Protocol-Level Loopback

An SFP-NID may support in-service or out-of-service loopbacks of any protocol layer, such as Layer 1-2-3-4, defined by VLAN, Service-Level, MAC/IP addresses, or any combination of layer 1-4 header criteria.

Figure 8:
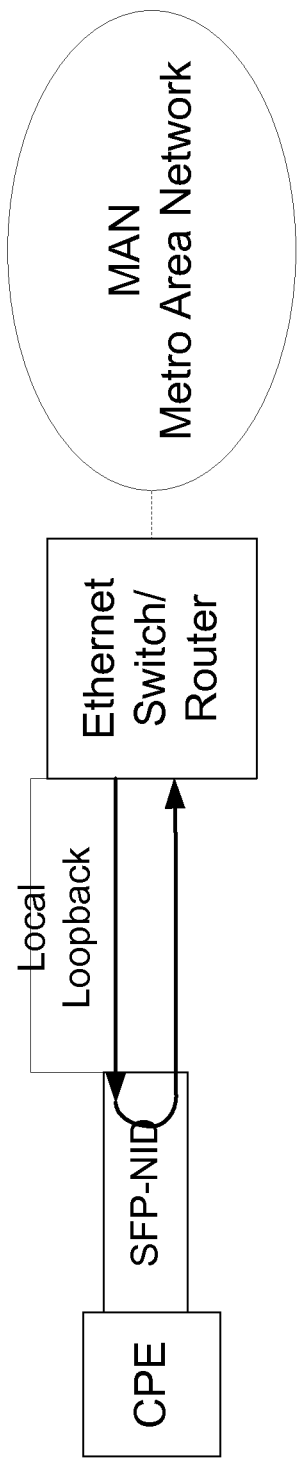
FIG. 8 shows an example of local loopback test.
Figure 9:
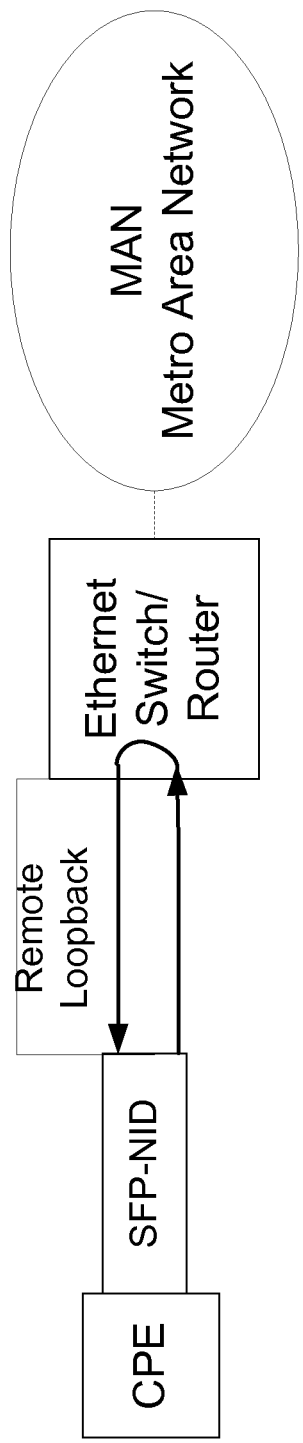
FIG. 9 shows an example of remote loopback test.

Two examples are shown in FIGS. 8-9. In FIG. 8, the service provider initiates the Loopback packet, and the SFP- NID sends the reply back. In FIG. 9, the SFP-NID initiates the loopback, and the service provider responds back.

Flexible Packet Generation

Figure 10:
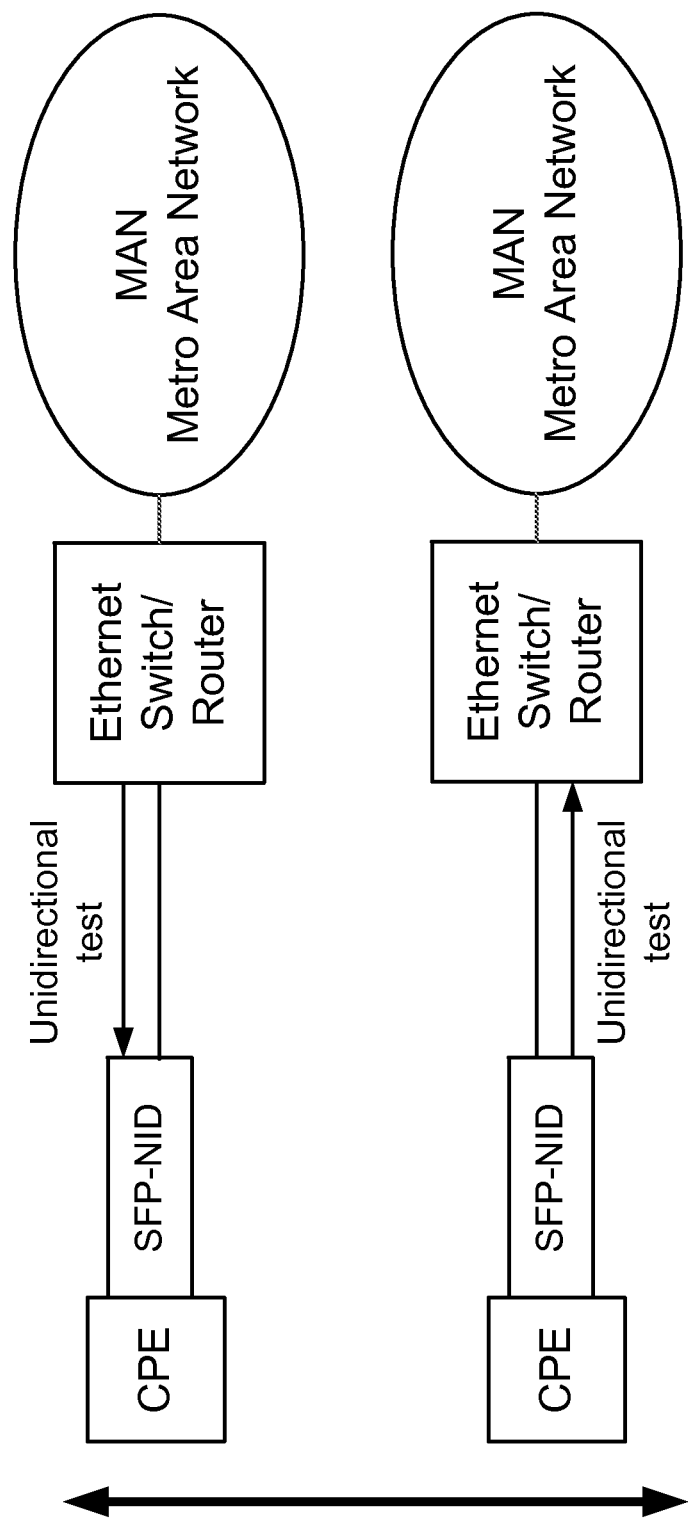
FIG. 10 shows example of unidirectional test.

An SFP-NID may support generating packets with preconfigured formats and size, and rates up to the supported line-rate. FIG. 10 shows that SFP-NID may generate packets at up to the line rate toward the network.

Flexible/Programmable Packet Processing and Termination

An SFP-NID may be able to process and terminate any configured flow, such as test flows. The SFP-NID should (in such case) be configurable or programmable enough for the purpose. FIG. 10 shows that SFP-NID may terminate and process packets generated by service provider, such as Test packets.

In-Service and Out-of-Service Testing

An SFP-NID may support functionality to perform in-service or out-of-service testing, such as RFC2544 throughput testing at rates up to the line rate. It may also generate reports from the testing. The testing may be automatic and controlled either locally on the SFP NID or remotely controlled.

Clock and Time Synchronization

An SFP-NID may support clock and Time synchronization, such as supporting IEEE 1588v2 Transparent clock, boundary clock, and Master or Slave clock. It may also support Link-level clock synchronizations, such as Synchronous Ethernet (SyncE). The recovered clock may then be communicated to the Electrical Interface. SyncE may be based on ITU-T G.8261, G.8262 and G.8264 standards.

Protection Switching

An SFP-NID may support protection switching for 1:1, 1+1, N:1, N+1, or Ring protection switching for any layer, including Ethernet, MPLS, OTN, SONET/SDH, Optical, and the like. In such a role, the SFP-NID may block Transmit, Receive or both Transmit and receive functionality, for all packets or a subset of packets.

Access Control List (ACL)

ACL is a method to allow or disallow data packets to pass through. ACL can be in either direction, meaning from network to customer, or from customer to network. ACL is usually based on some fields in the packet header, matching or not matching specific criteria. For example, ACL can stop packets with specific Ethernet MAC-DA or MAC-SA or VLAN or even a specific HTTP address.

Time Stamping

The SFP-NID may support Time stamping incoming packets. Time stamping can be done on all incoming packets or on a selected subset of incoming packets, such as a selected flow or a specific packet type, such as Timing and synchronization packets.

Loss Measurement or Throughput Measurement Counter Stamping

The SFP-NID may support Counter stamping incoming packets using packet or byte counters. Counter stamping can be done on all incoming packets or on a selected subset of incoming packets, such as a selected flow or a specific packet type, such as Loss Measurement packets.

Sequence Number Processing

SFP-NID may generate or check received sequence numbers for any flow and report, any out of sequence event, or drop out of sequence packets.

PRBS or Other Test Pattern Processing

SFP-NID may generate or check test packets with specific PRBS or other patterns. The processing includes checking for errors and/or dropped packets.

Control Plane

The SFP-NID may support control plane functionality, such as Routing (e.g. OSPF), Spanning Tree (SPT), LDP (Label distribution Protocol), IGMP, and the like.

Two-Port-MAC Relay (TPMR)

The TPMR function is an Ethernet repeater/relay function with some limited Link-level OAM capability that allows relaying the Link-level OAM failure detection to the closest Ethernet switches. TPMR is based on IEEE 802.1aj standard.

In-Band or Out-of-Band Management and Configuration

The SFP-NID requires some Management and Configuration. This configuration may be stored in ROM or flash on the SFP-NID, or it may be done via in-band or out-of band management, such as via a management VLAN or via I2C (two wire) Electrical interface. It should be possible for in-band and out-of band management to read and write to the ROM or flash memory and/or to communicate with the SoC in the SFP-NID.

Figure 13:
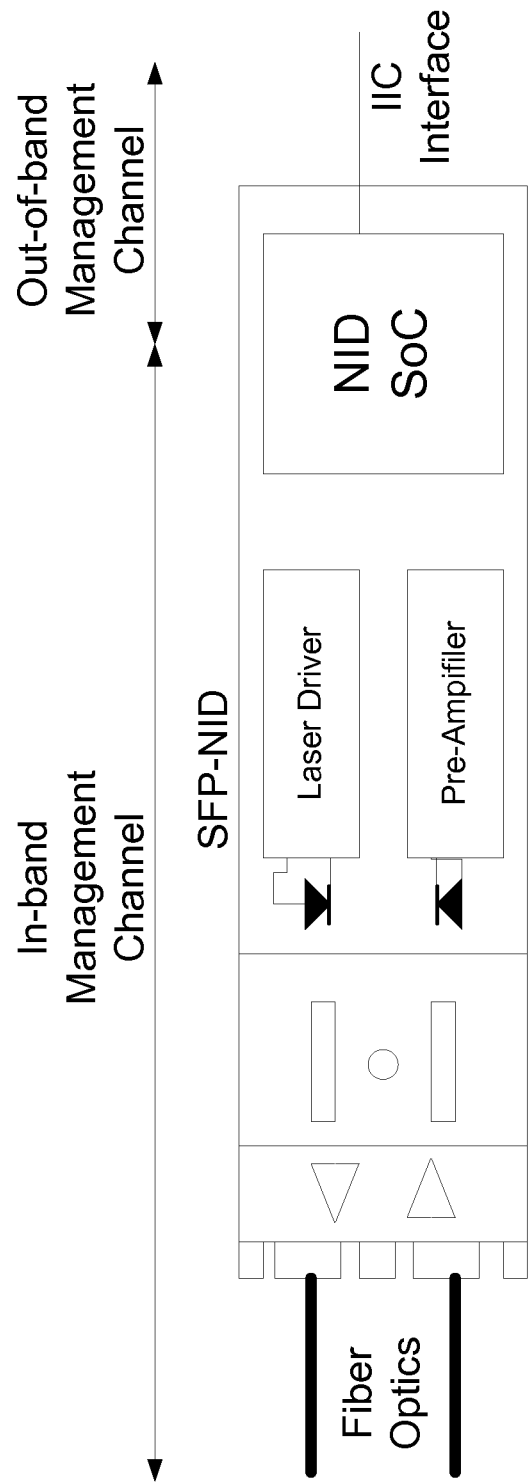
FIG. 13 shows an example/embodiment for in-band and out-of-band management.

FIG. 13 shows the out-of-band management channel, via I2C interface, which is one of the electrical interfaces. It also shows the in-band management channel, which is via the Fiber optics interface and may use Management VLAN, MAC address, IP Address, and the like.

Warm and Cold Boot and Reset

SFP-NID should be able to do a full complete reset or warm or cold booting by in-band or out-of band commands. This causes the SFP-NID to execute new configuration and or software stored on the ROM/Flash.

Other Functions

SFP-NID may also integrate other functions that exist today, inside an SFP in the NID SoC, to reduce the power, cost, and footprint. For example, these functions may include integrating temperature measurement, Serial number, Model number and other identification, current, voltage and power measurement, Diagnostics Monitoring functions (such as DDM), and the like. Even functions, such as DSP, Pre-equalization, Preamplifier, or Amplifier, may be integrated in the NID SoC.

SFP-NID Physical and Electrical Specifications

An SFP-NID fits completely inside an SFP, XFP, Xenpack, or other optical modules. The SFP-NID uses the internal SFP, XFP, Xenpack, or other optical modules' DC power, and it does not require an external power supply.

An SFP-NID has only 2 physical ports: one that connects to the SP WAN link, and another one that connects to the customer NE (CPE) or another SP network element. The WAN port is (most commonly) an optical Ethernet port, such as 1000BASE-LX, while the customer port is the SFI, XFI, XSBI, SGMII, or XAUI interface, depending on whether the SFP-NID is of SFP, XFP or Xenpack format.

An SFP-NID could also take the format of a Dingle with CAT5 interface that connects to a 10/100/1000BASE-T port, which supports Power over Ethernet (PoE). In such a case, the 10/100/1000BASE-T port via PoE provides the power of SFP-NID Dingle.

FIG. 1 shows an example (top view) of the Physical layout of an SFP-NID, built on a standard SFP module. It consists of the usual SFP electronics, such as Laser driver and pre-Amp (plus laser diode/laser detector), as well as a new chip called NID SoC that performs the NID functionalities.

There is a power and size limit for NID SoC chip, depending on which type of module format the SFP-NID has (SFP, XFP, Xenpack, and the like.). For example, for an SFP module, the NID SoC should have a size of less than 13.7 mm×13.7 mm. A size of 10 mm×10 mm NID SoC is a good size that fits very well inside an SFP module. Also, the power limitation for an NID SoC inside an SFP module is approximately 1 Watt.

An SFP-NID may be integrated in to other optical modules, such as:

SFP
SFP+
CFP
SFF
GBIC
PON MSA
XFP
XPAK
X2
XENPAK
300-PIN MSA

The Optical interface could be any rate, from 1 Gbit/sec to 100 Gbit/s, or more in the future. The SFP-NID functionality is add-on functionality to existing optical module functionality. The power consumption of the SFP-NID functionality shall be within the power limits of the optical module.

The network Interface could be fiber Optics or Electrical interface, such as T1/E1, T3/E3, Coaxial, Copper Ethernet, etc.

Figure 2:
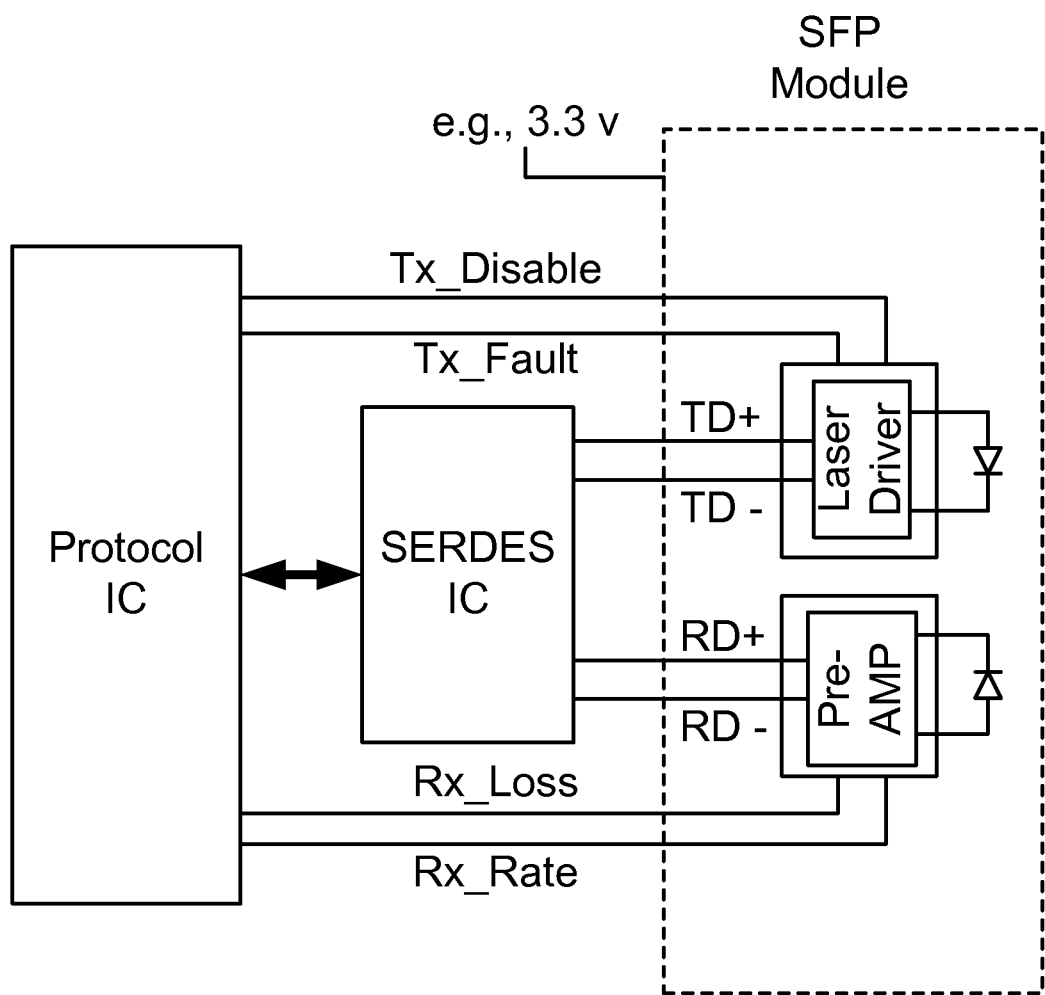
FIG. 2 shows the block diagram of a standard SFP module.

The electrical Interface of the SFP-NID depends on the Electrical interface defined for the specific optical module. Some examples of the electrical interfaces are:

Serdes
    2 differential pair
XAUI
SFI
    SF-4, SFI-5
XSBI
    16-bit
SGMII
    differential pairs
QSGMII
    Transports 4xSGMII on a single Serdes SFP-NID Block Diagrams An SFP, XFP and Xenpack module consist of Serdes, Laser driver, and amplifiers. FIG. 2 shows the block diagram of a standard SFP module. As can be seen from the diagram, the SFP module receives its power from the host device, via a 3.3 V power line. Also, the receive-and-transmit interfaces are Serdes interfaces with SFI protocol.

Figure 3:
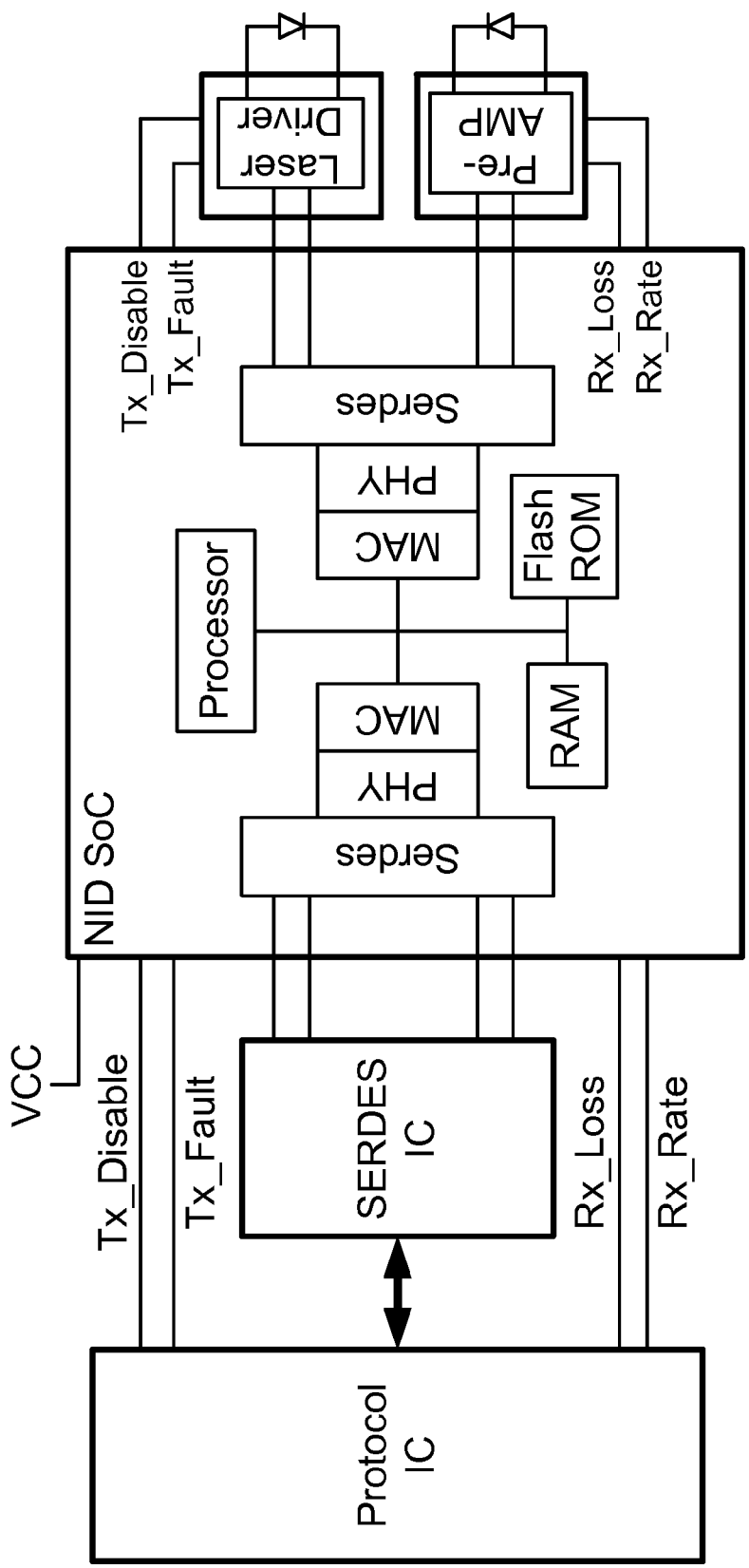
FIG. 3 shows (an example) a block diagram of an SFP-NID within an SFP module.

FIG. 3 shows (an example) a block diagram of an SFP-NID within an SFP module. As can be seen, the interfaces are the same as that of an SFP module, but internally, the PHY and MAC layers and the Serdes interfaces are terminated, and the packets are processed (for example) by a microprocessor and some dedicated hardware, called NID SoC, and then transmitted over another PHY, MAC and Serdes interface. The microprocessor interface is used as a logical port for Management and OAM flow termination and processing. Dedicated hardware, such as Encryption, ICV (Integrity Check Value), or CRC, could also exist in the SFP-NID module.

Figure 4:
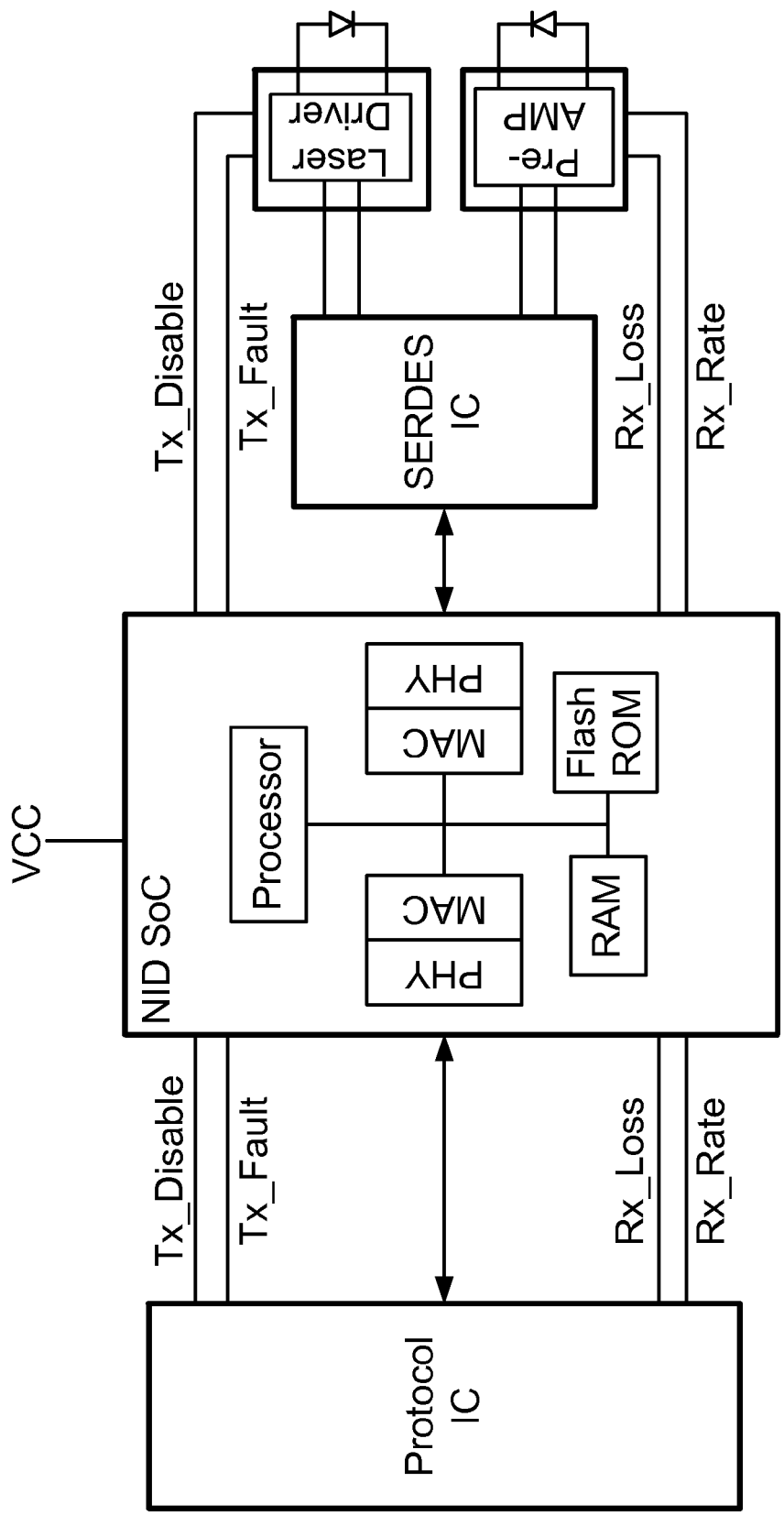
FIG. 4 shows (another example) an alternative block diagram of an SFP-NID within an SFP module, where the NID SoC is positioned between the Protocol IC and the Serdes IC.

FIG. 4 shows (another example) an alternative block diagram of an SFP-NID within an SFP module, where the NID SoC is positioned between the Protocol IC and the Serdes IC. Any other configurations and variations similar to the above are also covered under this invention.

Figure 7:
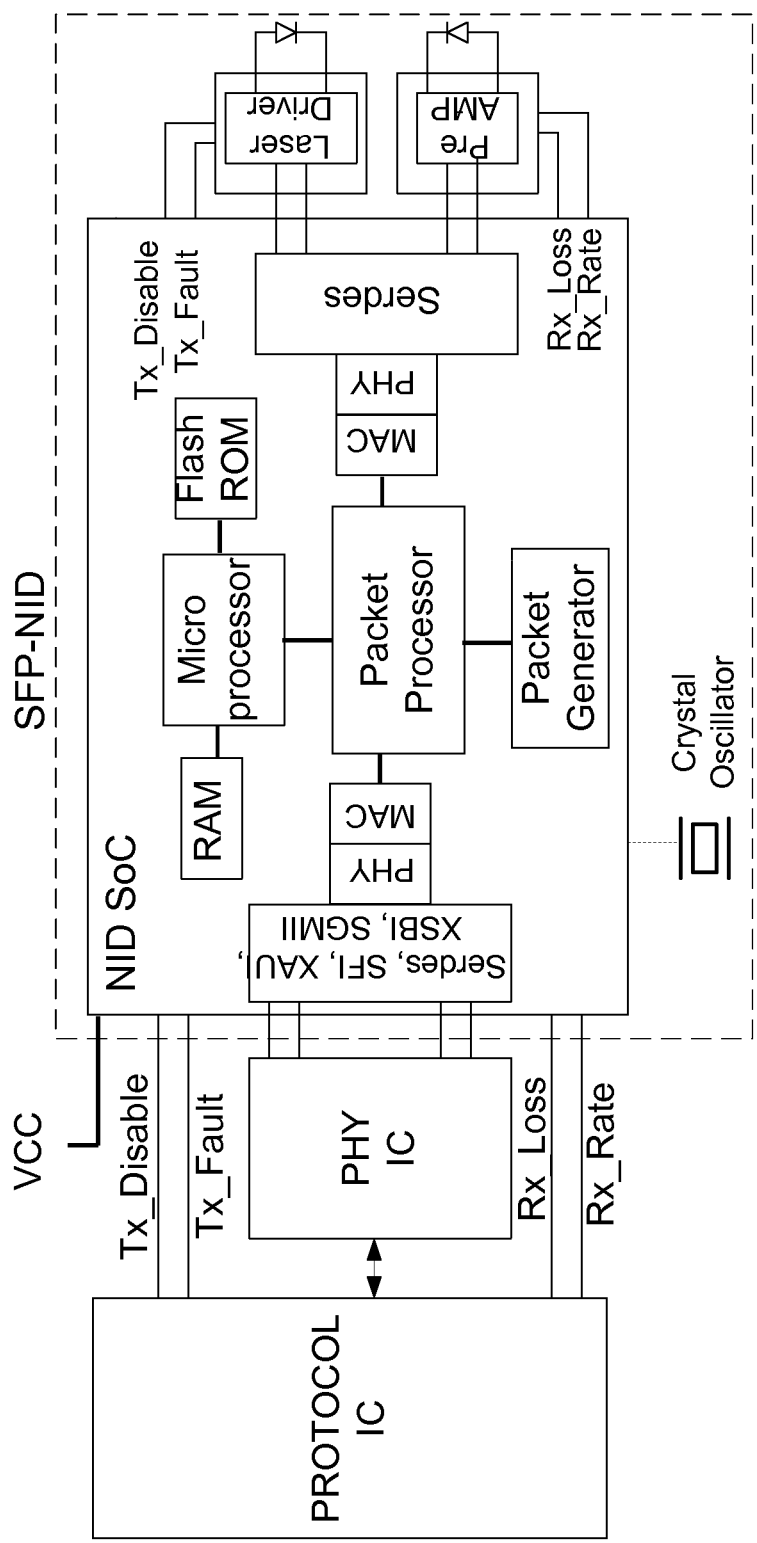
FIG. 7 shows an example of SFP-NID block diagram.

FIG. 7 shows a more detailed description of an SFP-NID. The NID SoC shown in the figure comprises of an inline packet processor that can process packets at line rate, including packet manipulation and modification or filtering the packet out to the microprocessor. There can also be a packet generator that is able to generate any configured flow of packet at configured rate, up to the line-rate. The packet generator is used in Testing.

FIG. 7 also shows that many different system side Electrical interfaces may exist, including Serdes, SFI, XAUI and XSBI. It also shows the option of using an oscillator, such as a crystal oscillator as clock source.

Figure 11:
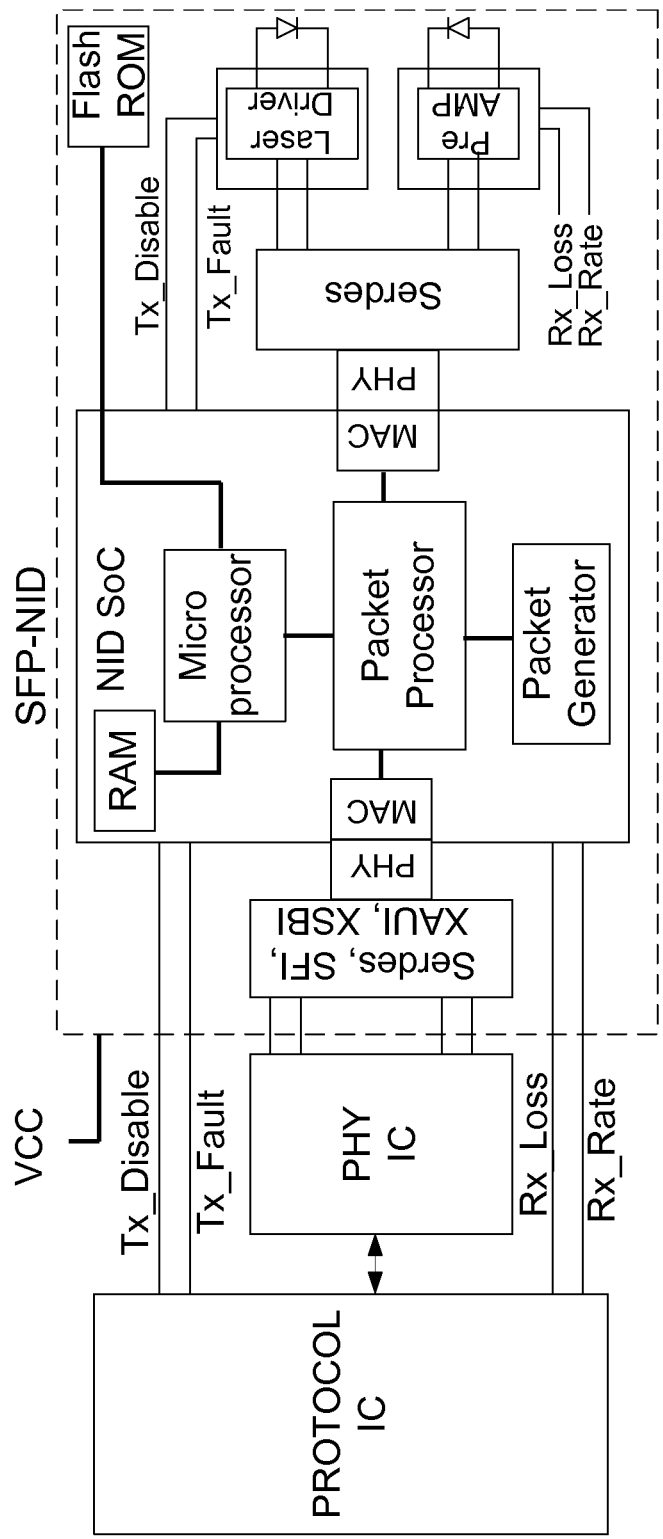
FIG. 11 shows an example of SFP-NID block diagram.

FIG. 11 shows an example of a different partitioning of the functionalities in an SFP-NID. In this example, the NID SoC does not include the PHY and ROM, and they are included in other ICs. Other types of partitioning are possible, such as having the microprocessor and possibly memories external to the NID SoC.

SFP-NID Applications

An SFP-NID could have many applications. The following lists some known applications of SFP-NID:

As demarcation device between a customer and a Service provider

As retrofit to a customer CPE/CE or Service Provider PE Ethernet switch.

Demarcation Device, e.g. Between a Customer and SP

Figure 5:
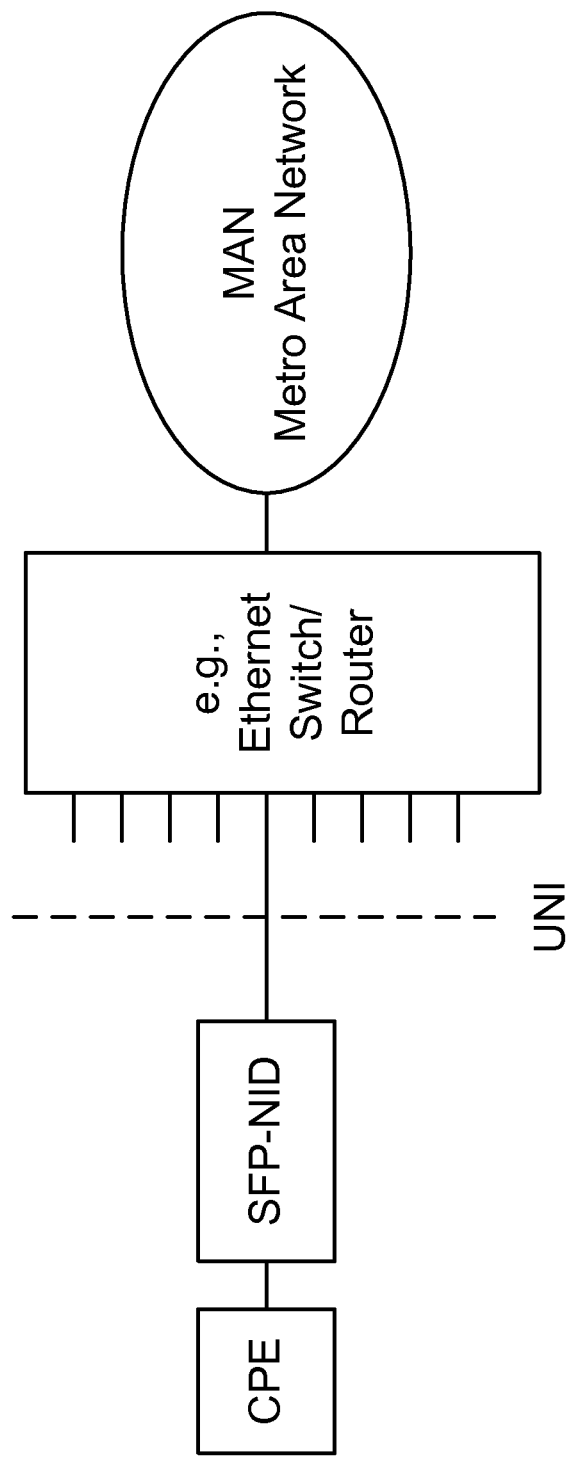
FIG. 5 shows an application of a NID, as a Demarcation Device, e.g. between a customer and SP.

This application is the main application of a NID. In this application, the standard SFP, XFP or Xenpack module of a customer CPE UNI (user network interface) interface is replaced with SFP-NID. The SFP-NID belongs to the Service Provider and is used to monitor and diagnose service connectivity up to the customer CPE box. This application is shown in FIG. 5.

Retrofit to a Customer CPE/CE or a Service Provider PE Ethernet Switch

Figure 6:
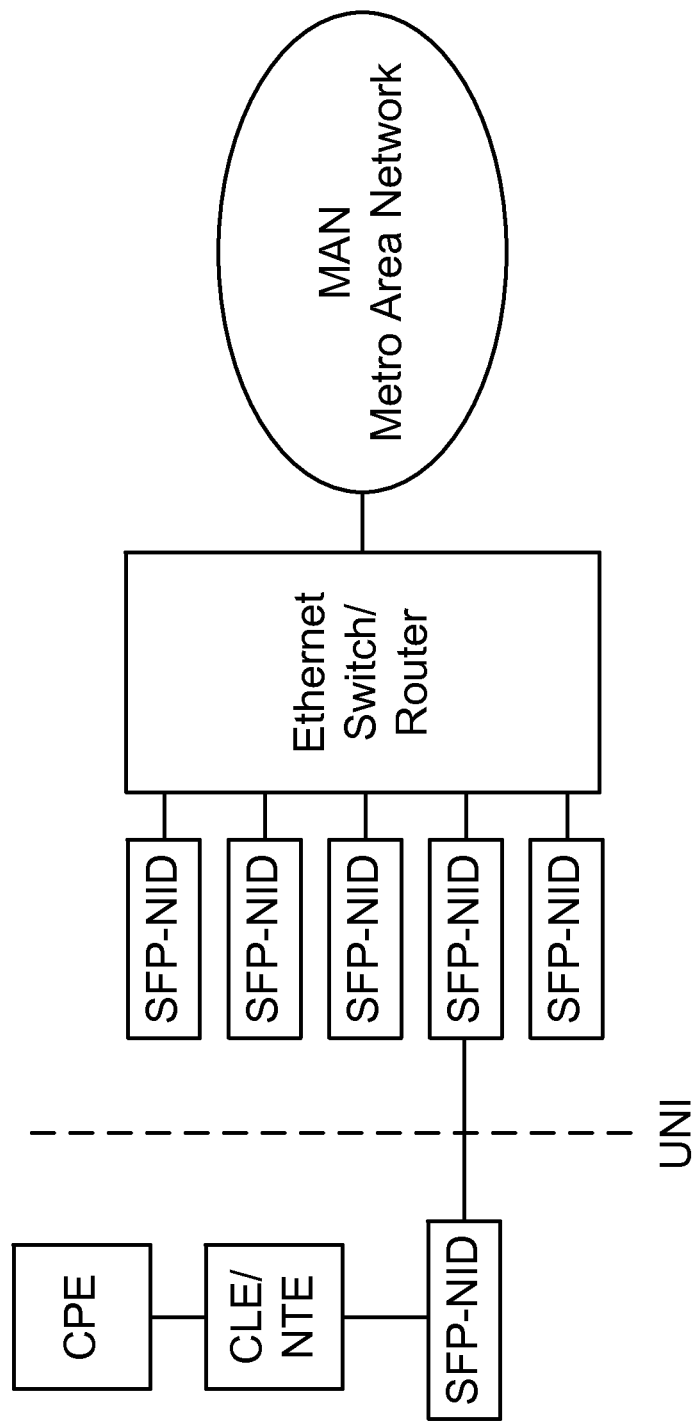
FIG. 6 shows an application of SFP-NID, to retrofit to a customer CPE/CE or a Service Provider PE Ethernet switch.

In this application the SFP-NID could be used to retrofit the customer-located CLE/NTE and/or the Service Provider PE switch, when SFP-NID functionalities are not built in to those boxes. FIG. 6 shows this application of SFP-NID.

SFP-NID Advantages

SFP-NID is a very small device that can be easily stored, mailed to customers, or carried in the pocket of the maintenance personnel.

SFP-NID requires no external power and does not add any extra footprint, therefore, making it ideal for upgrading existing SFP modules, without requiring extra space, especially in high density line cards.

It costs less to build that, to maintain it, to install it, to store it, or to ship it to the user/customer.

Note that SFP-NID does not have its own dedicated power supply, therefore, making it unavailable when the host device (such as a customer router or switch) loses power. However, the advantages mentioned above are far more important for the user and Service Provider. Thus, the current invention and its embodiments are very useful and important for the user and Service Provider, in this industry.

This invention applies to any number of ports and any type of components. It also applies to any type of communications and devices or interfaces. This invention applies to any order or setup or configuration for components, circuits, and subsystems, for network communication and connectivity. It applies to any communication formats and protocols (and any combinations of software and hardware). The illustrations above just serve examples, but they are not limiting the scope of our invention here.

The low power laser driver and/or amplifier can be used, to meet our power requirements. In addition, the components can be cooled down (or faster cooled down), using fan, semiconductor chip cooling methods or devices, air or fluid circulation, heat pump effects, compressor effects, big solid heat sink(s), radiators or fins (to add more cross sectional areas), or any other cooling techniques. Using these methods, one can satisfy our requirements for circuits, components, and heat management, for efficiency and normal operation ranges/environments.

The Appendix also shows some of the devices (actual photos of some of the Optical Modules) used here, which belong to their respective manufacturers and companies.

Any variations of the above teaching are also intended to be covered by this patent application.

The invention claimed is:

1. A network demarcation device, said network demarcation device comprising:
   a network demarcation module on a system-on-chip circuit;
   a short form factor pluggable optical module;
   wherein said network demarcation module is mounted to said short form factor pluggable optical module's circuit board;
   wherein electrical power for said network demarcation module is provided by said short form factor pluggable optical module, without having a separate external power supply;
   wherein said network demarcation module comprises at least two ports, with at least one of said at least two ports having its own media access control and physical layers;
   wherein a management function module, comprising a management software, is operated on said network demarcation module;
   said management function module supports all following functions:
      a) connectivity check function,
      b) service level loop back function,
      c) media conversion function, and
      d) in-band management function, to manage from a remote location;
   wherein said in-band management function is configured via a simple network management protocol or a network management system interface;
   wherein said network demarcation device is located between a service provider and a customer equipment;
   wherein said service provider directly monitors, manages, or checks a status and health of connections and services for said customer equipment through said network demarcation device.

2. The network demarcation device as recited in claim 1, wherein said management function module supports out-of-band management function.

3. The network demarcation device as recited in claim 1, wherein said management function module supports in-band control plane function.

4. The network demarcation device as recited in claim 1, wherein said management function module supports out-of-band control plane function.

5. The network demarcation device as recited in claim 1, wherein said management function module supports time-stamping function.

6. The network demarcation device as recited in claim 1, wherein said management function module supports packet or byte counter stamping function.

7. The network demarcation device as recited in claim 1, wherein said management function module supports leaky link-level loopback function.

8. The network demarcation device as recited in claim 1, wherein said management function module supports protocol layer loopback function.

9. The network demarcation device as recited in claim 1, wherein said management function module supports flexible packet generation function.

10. The network demarcation device as recited in claim 1, wherein said management function module supports flexible/programmable packet processing and termination function.

11. The network demarcation device as recited in claim 1, wherein said management function module supports in-service and out-of-service testing function.

12. The network demarcation device as recited in claim 1, wherein said management function module supports clock and time synchronization function.

13. The network demarcation device as recited in claim 1, wherein said management function module supports protection switching function.

14. The network demarcation device as recited in claim 1, wherein said management function module supports access control list function.

15. The network demarcation device as recited in claim 1, wherein said management function module supports protocol conversion and interworking function.

16. The network demarcation device as recited in claim 1, wherein said management function module supports tunnel initiation and termination function.

17. The network demarcation device as recited in claim 1, wherein said management function module supports header manipulation function.

18. The network demarcation device as recited in claim 1, wherein said management function module supports sequence number processing function.

19. The network demarcation device as recited in claim 1, wherein said management function module supports warm and cool booting and reset function.

20. The network demarcation device as recited in claim 1, wherein said management function module supports one or more of following functions: latching loopback function, mirroring function, link trace function, alarm indication signal function, remote detection indication function, lock function, test function, dying gasp function, port and interface failure indication function, security function, loss measurement or throughput measurement counter stamping function, generate or check test packets or test pattern processing function, integrating temperature measurement function, model number and identification function, current measurement function, voltage measurement function, power measurement function, diagnostics monitoring function, pre-equalization function, or pre-amplifier function.

21. A network demarcation device, said network demarcation device comprising:
   a network demarcation module on a system-on-chip circuit;
   a short form factor pluggable optical module;
   wherein said network demarcation module is mounted to said short form factor pluggable optical module's circuit board;
   wherein electrical power for said network demarcation module is provided by said short form factor pluggable optical module, without having a separate external power supply;
   wherein said network demarcation module comprises at least two ports, with at least one of said at least two ports having its own media access control and physical layers;
   wherein a management function module, comprising a management software, is operated on said network demarcation module;
   said management function module supports all following functions:
      a) simple link level loop back function,
      b) service level loop back function,
      c) media conversion function, and d) in-band management function, to manage from a remote location;
wherein said in-band management function is configured via a simple network management protocol or a network management system interface;
wherein said network demarcation device is located between a service provider and a customer equipment;
wherein said service provider directly monitors, manages, or checks a status and health of connections and services for said customer equipment through said network demarcation device.

22. A network demarcation device, said network demarcation device comprising:
a network demarcation module on a system-on-chip circuit;
a short form factor pluggable optical module;
wherein said network demarcation module is mounted to said short form factor pluggable optical module's circuit board;
wherein electrical power for said network demarcation module is provided by said short form factor pluggable optical module, without having a separate external power supply;
wherein said network demarcation module comprises at least two ports, with at least one of said at least two ports having its own media access control and physical layers;
wherein a management function module, comprising a management software, is operated on said network demarcation module;
said management function module supports all following functions:
a) connectivity check function,
b) simple link level loop back function,
c) media conversion function, and
d) in-band management function, to manage from a remote location;
wherein said in-band management function is configured via a simple network management protocol or a network management system interface;
wherein said network demarcation device is located between a service provider and a customer equipment;
wherein said service provider directly monitors, manages, or checks a status and health of connections and services for said customer equipment through said network demarcation device.

* * * * *